(12) United States Patent
Mitra et al.

(10) Patent No.: US 12,291,480 B2
(45) Date of Patent: May 6, 2025

(54) ADHERING GLASS COVER SHEET TO A FRAME

(71) Applicant: CORNING INCORPORATED, Corning, NY (US)

(72) Inventors: Arpita Mitra, Columbus, OH (US); Michael William Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 861 days.

(21) Appl. No.: 17/295,742

(22) PCT Filed: Nov. 19, 2019

(86) PCT No.: PCT/US2019/062120
§ 371 (c)(1),
(2) Date: May 20, 2021

(87) PCT Pub. No.: WO2020/112430
PCT Pub. Date: Jun. 4, 2020

(65) Prior Publication Data
US 2022/0017413 A1 Jan. 20, 2022

Related U.S. Application Data

(60) Provisional application No. 62/772,776, filed on Nov. 29, 2018.

(51) Int. Cl.
*B32B 3/10* (2006.01)
*B32B 7/12* (2006.01)
(Continued)

(52) U.S. Cl.
CPC ............... *C03C 17/28* (2013.01); *B32B 7/12* (2013.01); *B32B 17/06* (2013.01); *C03C 17/322* (2013.01);
(Continued)

(58) Field of Classification Search
None
See application file for complete search history.

(56) References Cited

U.S. PATENT DOCUMENTS

| | | |
|---|---|---|
| 4,455,338 A | 6/1984 | Henne |
| 4,899,507 A | 2/1990 | Mairlot |

(Continued)

FOREIGN PATENT DOCUMENTS

| | | |
|---|---|---|
| BE | 1000350 A5 | 11/1988 |
| CN | 101678580 A | 3/2010 |

(Continued)

OTHER PUBLICATIONS

International Search Report and Written Opinion of the International Searching Authority; PCT/US2018/012215 Dated Aug. 1, 2018; 21 Pgs; European Patent Office.

(Continued)

*Primary Examiner* — Christopher M Polley
(74) *Attorney, Agent, or Firm* — Daniel J. Greenhalgh

(57) ABSTRACT

Disclosed herein are embodiments of a method of forming a glass article having a glass cover sheet and a frame. The glass cover sheet includes a first major surface and a second major surface in which the second major surface is opposite the first major surface. The frame has a support surface. In the method, a pressure-sensitive adhesive tape is applied to a first region of the glass cover sheet or of the frame. A liquid adhesive is applied to a second region of the glass cover sheet or of the frame. Pressure is applied to the glass cover sheet and the frame to cause the pressure-sensitive adhesive to adhere the glass cover sheet to the frame at a first bond strength. The liquid adhesive is cured to adhere the glass cover sheet to the frame at a second bond strength that is greater than the first bond strength.

19 Claims, 6 Drawing Sheets

(51) Int. Cl.
*B32B 17/06* (2006.01)
*C03C 17/28* (2006.01)
*C03C 17/32* (2006.01)
*C03C 27/10* (2006.01)
*C09J 5/00* (2006.01)
*B32B 37/12* (2006.01)
*B32B 38/18* (2006.01)

(52) U.S. Cl.
CPC ............ *C03C 17/326* (2013.01); *C03C 27/10* (2013.01); *C09J 5/00* (2013.01); *B32B 37/12* (2013.01); *B32B 2037/1253* (2013.01); *B32B 38/1866* (2013.01); *B32B 2315/08* (2013.01)

(56) References Cited

U.S. PATENT DOCUMENTS

| | | |
|---|---|---|
| 4,985,099 A | 1/1991 | Mertens et al. |
| 6,086,983 A | 7/2000 | Yoshizawa |
| 6,332,690 B1 | 12/2001 | Murofushi |
| 6,348,118 B1 | 2/2002 | Johnson et al. |
| 6,582,799 B1 | 6/2003 | Brown et al. |
| 7,375,782 B2 | 5/2008 | Yamazaki et al. |
| 8,344,369 B2 | 1/2013 | Yamazaki et al. |
| 8,549,885 B2 | 10/2013 | Dannoux et al. |
| 8,833,106 B2 | 9/2014 | Dannoux et al. |
| 8,912,447 B2 | 12/2014 | Leong et al. |
| 9,061,934 B2 | 6/2015 | Bisson et al. |
| 9,593,042 B2 | 3/2017 | Hu et al. |
| 9,802,485 B2 | 10/2017 | Masuda et al. |
| 9,895,975 B2 | 2/2018 | Lee et al. |
| 9,902,640 B2 | 2/2018 | Dannoux et al. |
| 9,931,817 B2 | 4/2018 | Rickerl |
| 10,131,118 B2 | 11/2018 | Kang et al. |
| 2007/0223121 A1 | 9/2007 | Franck et al. |
| 2009/0179840 A1 | 7/2009 | Tanaka et al. |
| 2009/0185127 A1 | 7/2009 | Tanaka et al. |
| 2010/0031590 A1 | 2/2010 | Buchwald et al. |
| 2012/0202030 A1 | 8/2012 | Kondo et al. |
| 2013/0088441 A1 | 4/2013 | Chung et al. |
| 2013/0251969 A1 | 9/2013 | Sasaki et al. |
| 2014/0036428 A1 | 2/2014 | Seng et al. |
| 2014/0232969 A1* | 8/2014 | Tsubaki ............ G02F 1/133308 156/305 |
| 2015/0212362 A1* | 7/2015 | Takaira ............... G02F 1/13338 349/12 |
| 2015/0246507 A1 | 9/2015 | Brown et al. |
| 2016/0297176 A1 | 10/2016 | Rickerl |
| 2016/0306451 A1 | 10/2016 | Isoda et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0197561 A1 | 7/2017 | McFarland |
| 2017/0327402 A1 | 11/2017 | Fujii et al. |
| 2017/0349473 A1 | 12/2017 | Moriya et al. |
| 2018/0050948 A1 | 2/2018 | Faik et al. |
| 2018/0111569 A1 | 4/2018 | Faik et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0188869 A1* | 7/2018 | Boggs ...................... B32B 7/12 |
| 2018/0210118 A1 | 7/2018 | Gollier et al. |
| 2018/0245125 A1 | 8/2018 | Tsai et al. |
| 2018/0354235 A1 | 12/2018 | Soon |
| 2019/0012032 A1 | 1/2019 | Brandao et al. |
| 2019/0039935 A1 | 2/2019 | Couillard et al. |
| 2019/0315648 A1 | 10/2019 | Kumar et al. |
| 2020/0062632 A1 | 2/2020 | Brennan et al. |
| 2020/0171952 A1 | 6/2020 | Couillard et al. |
| 2021/0008846 A1 | 1/2021 | Kumar et al. |

FOREIGN PATENT DOCUMENTS

| | | |
|---|---|---|
| CN | 101684032 A | 3/2010 |
| CN | 102566841 A | 7/2012 |
| CN | 103210438 A | 7/2013 |
| CN | 203825589 U | 9/2014 |
| CN | 104679341 A | 6/2015 |
| CN | 204463066 U | 7/2015 |
| CN | 104843976 A | 8/2015 |
| CN | 105511127 A | 4/2016 |
| CN | 107027302 A | 8/2017 |
| CN | 212446589 U | 2/2021 |
| DE | 4415878 A1 | 11/1995 |
| DE | 102004022008 A1 | 12/2004 |
| DE | 102013214108 A1 | 2/2015 |
| EP | 2872326 A1 | 5/2015 |
| EP | 3302968 A1 | 4/2018 |
| FR | 2918411 A1 | 1/2009 |
| GB | 2011316 A | 7/1979 |
| JP | 3059337 U | 6/1991 |
| JP | 11-060293 A | 3/1999 |
| JP | 2003-500260 A | 1/2003 |
| JP | 2003-321257 A | 11/2003 |
| JP | 2004-284839 A | 10/2004 |
| JP | 2013-084269 A | 5/2013 |
| JP | 2013-188993 A | 9/2013 |
| JP | 2015-092422 A | 5/2015 |
| JP | 5748082 B2 | 7/2015 |
| JP | 2016-031696 A | 3/2016 |
| JP | 5976561 B2 | 8/2016 |
| JP | 2016-173794 A | 9/2016 |
| JP | 2016-203609 A | 12/2016 |
| JP | 2016-207200 A | 12/2016 |
| KR | 10-2016-0144008 A | 12/2016 |
| WO | 96/21704 A2 | 7/1996 |
| WO | 98/01649 A1 | 1/1998 |
| WO | 2000/073062 A1 | 12/2000 |
| WO | 2007/108861 A1 | 9/2007 |
| WO | 2012/058084 A2 | 5/2012 |
| WO | 2014/011334 A1 | 1/2014 |
| WO | 2014/175371 A1 | 10/2014 |
| WO | 2015/031594 A2 | 3/2015 |
| WO | 2016/044360 A1 | 3/2016 |
| WO | 2016/125713 A1 | 8/2016 |
| WO | 2016/136758 A1 | 9/2016 |
| WO | 2016/196531 A1 | 12/2016 |
| WO | 2016/196546 A1 | 12/2016 |
| WO | 2017/155932 A1 | 9/2017 |
| WO | 2018/005646 A1 | 1/2018 |
| WO | 2018/009504 A1 | 1/2018 |
| WO | 2018/075853 A1 | 4/2018 |
| WO | 2018/081068 A1 | 5/2018 |
| WO | 2018/125683 A1 | 7/2018 |
| WO | 2018/129065 A2 | 7/2018 |
| WO | 2020/023606 A1 | 1/2020 |
| WO | 2020/142602 A1 | 7/2020 |

OTHER PUBLICATIONS

International Search Report and Written Opinion of the International Searching Authority; PCT/US2018/041062 Dated Nov. 13, 2018; 15 Pgs; European Patent Office.

Invitation to Pay Additional Fees of the International Searching Authority; PCT/US2018/012215; Mailed May 11, 2018; 13 Pages; European Patent Office.

Jan Belis, Bart Inghelbrecht, Rudy Van Impe and Dieter Callewaert, Cold bending of laminated glass panels, HERON, 2007, 52, 123-146.

Kyriaki G. Datsiou and Mauro Overend, Behaviour of cold bent glass plates during the shaping process, Engineered Transparency. International Conference at glasstec, Düsseldorf, Germany, Oct. 21 and 22, 2014.

Laura Galuppi and Gianni Royer-Carfagni, Optimal cold bending of laminated glass, International Journal of Solids and Structures, 2015, 67-68, 231-243.

Chinese Patent Application No. 201980089882.4, Office Action dated Nov. 2, 2022, 8 pages (English Translation only), Chinese Patent Office.

(56) References Cited

OTHER PUBLICATIONS

International Search Report and Written Opinion of the International Searching Authority; PCT/US2019/062120; dated Mar. 19, 2020; 10 pages; European Patent Office.

\* cited by examiner

ADHERING GLASS COVER SHEET TO A FRAME

CROSS-REFERENCE TO RELATED APPLICATIONS

This application is a national stage application under 35 U.S.C. § 371 of International Application No. PCT/US2019/062120 filed on Nov. 19, 2019, which claims the benefit of priority under 35 U.S.C. § 119 of U.S. Provisional Application Ser. No. 62/772,776 filed on Nov. 29, 2018 the content of which is relied upon and incorporated herein by reference in its entirety.

BACKGROUND

The disclosure relates to curved glass articles and methods for forming the same, and more particularly to vehicle interior systems including a glass article with a cold-formed or cold-bent cover glass and methods for forming the same. Vehicle interiors include curved surfaces and can incorporate displays in such curved surfaces. The materials used to form such curved surfaces are typically limited to polymers, which do not exhibit the durability and optical performance as glass. As such, curved glass substrates are desirable, especially when used as covers for displays. Existing methods of forming such curved glass substrates, such as thermal forming, have drawbacks including high cost, optical distortion, and surface marking. Accordingly, Applicant has identified a need for vehicle interior systems that can incorporate a curved glass substrate in a cost-effective manner and without problems typically associated with glass thermal forming processes.

SUMMARY

According to an aspect, embodiments of the disclosure relate to a method of forming a glass article having a glass cover sheet and a frame. The glass cover sheet includes a first major surface and a second major surface in which the second major surface is opposite the first major surface. The frame has a support surface. In the method, a pressure-sensitive adhesive tape is applied to a first region of the first major surface of the glass cover sheet or of the support surface of the frame. A liquid adhesive is applied to a second region of the first major surface of the glass cover sheet or of the support surface of the frame. The glass cover sheet is positioned in relation to the frame such that the first major surface of the glass cover sheet faces the support surface of the frame. Pressure is applied to the glass cover sheet and the frame to cause the pressure-sensitive adhesive to adhere the glass cover sheet to the frame at a first bond strength. The liquid adhesive is cured to adhere the glass cover sheet to the frame at a second bond strength, the second bond strength being greater than the first bond strength.

According to another aspect, embodiments of the disclosure relate to a glass article. The glass article includes a glass cover sheet having a first major surface and a second major surface. The second major surface has at least a first curve. The glass article also includes a frame having a support surface with at least a first complementary curve. The second major surface of the cover glass sheet faces the support surface of the frame, and the first complementary curve is complementary to the first curve. A pressure-sensitive adhesive tape is disposed in at least a first region between the first major surface of the frame and the second major surface of the glass cover sheet. Further, a cured liquid adhesive is disposed in at least a second region between the first major surface of the frame and the second major surface of the glass cover sheet.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION

Reference will now be made in detail to various embodiments, examples of which are illustrated in the accompanying drawings. In general, a vehicle interior system may include a variety of different curved surfaces that are designed to be transparent, such as curved display surfaces and curved non-display glass covers, and the present disclosure provides articles and methods for forming these curved surfaces from a glass material. Forming curved vehicle surfaces from a glass material provide a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials.

Accordingly, as will be discussed in more detail below, Applicant has developed a glass article and related manufacturing processes that provide an efficient and cost effective way to form an article, such as a display for a vehicle interior system, utilizing a cold-bent piece of glass substrate.

In particular embodiments, the glass substrate is bent to the curved shape of a frame using a roller. As disclosed herein, the curved shape is maintained initially using a pressure-sensitive adhesive that is activated by the roller, which provides initial tack strength (i.e., a level of strength that allows for processing and handling that is lower than the final bonding strength) to hold the curved shape of the glass substrate. Thereafter, a liquid adhesive is allowed to cure for an extended period of time to provide a full structural bond between the glass substrate and frame. A glass article formed using such a dual adhesive system as disclosed herein allows for a more economical manufacturing process.

Figure 1:
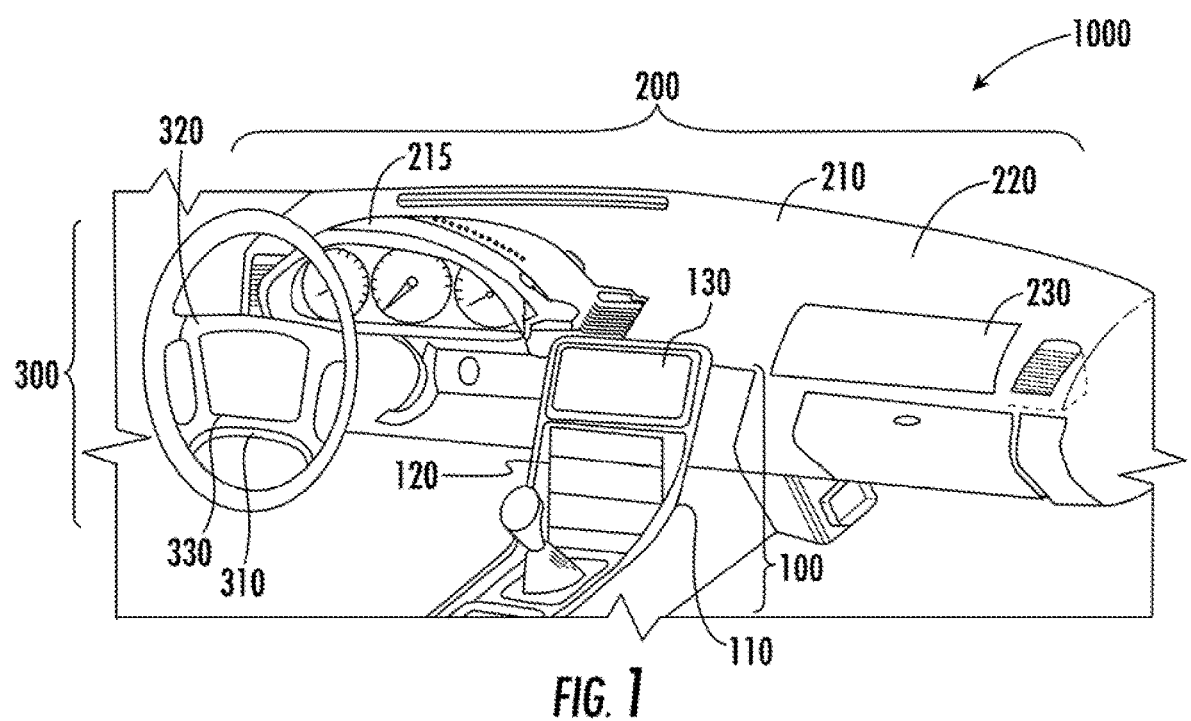
FIG. 1 is a perspective view of a vehicle interior with vehicle interior systems, according to exemplary embodiments.

FIG. 1 shows an exemplary vehicle interior 1000 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheel base 310, with a curved surface 320 and a curved display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle).

The embodiments of the glass article described herein can be used in each of vehicle interior systems 100, 200 and 300. Further, the glass articles discussed herein may be used as curved cover glasses for any of the curved display embodiments discussed herein, including for use in vehicle interior systems 100, 200 and/or 300. Further, in various embodiments, various non-display components of vehicle interior systems 100, 200 and 300 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a decorative coating (e.g., an ink or pigment coating) with a pattern (e.g., a brushed metal appearance, a wood grain appearance, a leather appearance, a colored appearance, etc.) or without a pattern to visually match the glass components with adjacent non-glass components. In specific embodiments, such ink or pigment coating may have a transparency level that provides for deadfront functionality.

Figure 2:
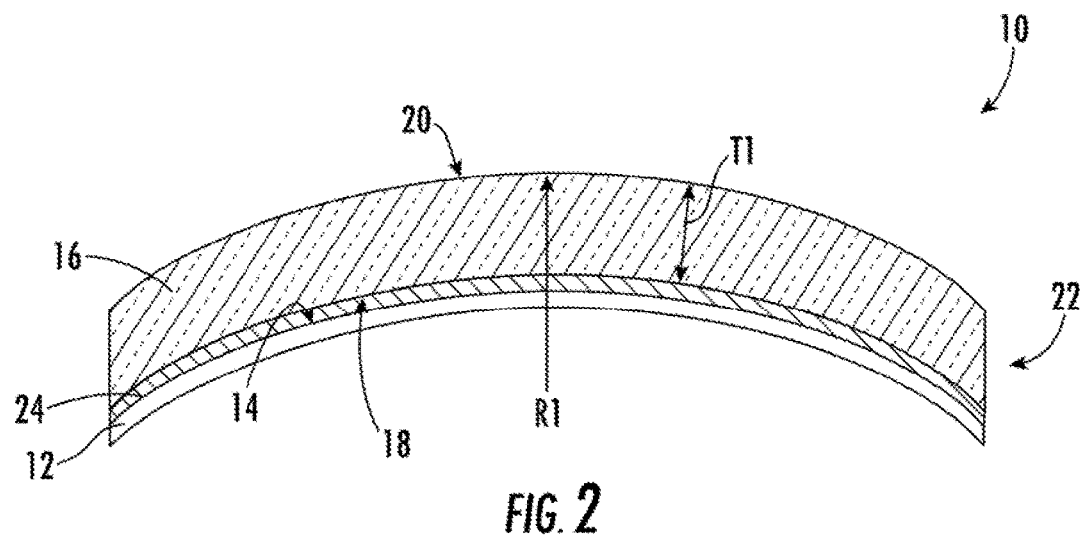
FIG. 2 is a cross-sectional view of a glass substrate following cold bending and attachment to a curved frame, according to an exemplary embodiment.

FIG. 2 depicts a cross-sectional view of a glass article 10, such as the cover glass for curved display 130 (as shown in FIG. 1), according to exemplary embodiments. It should be understood that while FIG. 2 is described in terms of forming curved display 130, the glass article 10 of FIG. 2 may be used in any suitable curved glass application, including any curved or non-curved glass component of any of the vehicle interior systems of FIG. 1. Such glass components could be display or non-display regions, e.g., a flat display area and a curved non-display area, curved displays, and curved display and curved non-display areas. Further, the curved glass articles may include a curved glass article having a concave curvature, a convex curvature, or both convex and concave curvatures.

In FIG. 2, a frame 12 includes a support surface 14 which has a curvature. Glass article 10 includes a glass substrate 16. Glass substrate 16 includes a first major surface 18 and a second major surface 20 opposite first major surface 18. A minor surface 22 connects the first major surface 18 and the second major surface 20, and in specific embodiments, minor surface 22 defines the outer perimeter of glass substrate 16. The glass substrate 16 is attached to the frame 12 via an adhesive layer 24. In embodiments, the adhesive layer 24 comprises at least two adhesives. In such embodiments, a first adhesive is a pressure-sensitive adhesive that adheres the glass substrate 16 to the frame 12 to provide tack strength, and a second, liquid adhesive cures over time to provide long-term strength. In embodiments, the pressure sensitive adhesive provides a first bond strength, or tack strength, of from 0.05 to 5 MPa, and the liquid adhesive provides a second bond strength of more than 0.5 MPa to 25 MPa. In embodiments, "bond strength" refers to at least one of the tensile strength, shear strength, peel strength, or cleavage strength of the adhesive at room temperature.

The glass substrate 16 has a curved shape such that first major surface 18 and second major surface 20 each include at least one curved section having a radius of curvature. In the specific embodiments shown, support surface 14 of frame 12 is a convex curved surface. In such embodiments, the glass substrate 16 is bent such that first major surface 18 defines a concave shape that generally conforms to the convex curved shape of support surface 14, and second major surface 20 defines a convex shape that generally matches or mirrors the convex curved shape of support surface 14. In such embodiments, surfaces 18, 20 both define a first radius of curvature R1 that generally matches the radius of curvature of support surface 14 of frame 12.

In embodiments, R1 is between 30 mm and 5 m. Further, in embodiments, the glass substrate 16 has a thickness T1 (e.g., an average thickness measured between surfaces 18, 20) shown in FIG. 2 that is in a range from 0.05 mm to 2 mm. In specific embodiments, T1 is less than or equal to 1.5 mm and in more specific embodiments, T1 is 0.4 mm to 1.3 mm. Applicant has found that such thin glass substrates can be cold formed to a variety of curved shapes (including the relatively high curvature radii of curvature discussed herein) utilizing rolling without breakage while at the same time providing for a high quality cover layer for a variety of vehicle interior applications. In addition, such thin glass substrates 16 may deform more readily, which could potentially compensate for shape mismatches and gaps that may exist relative to support surface 14 and/or frame 12.

Figure 3:
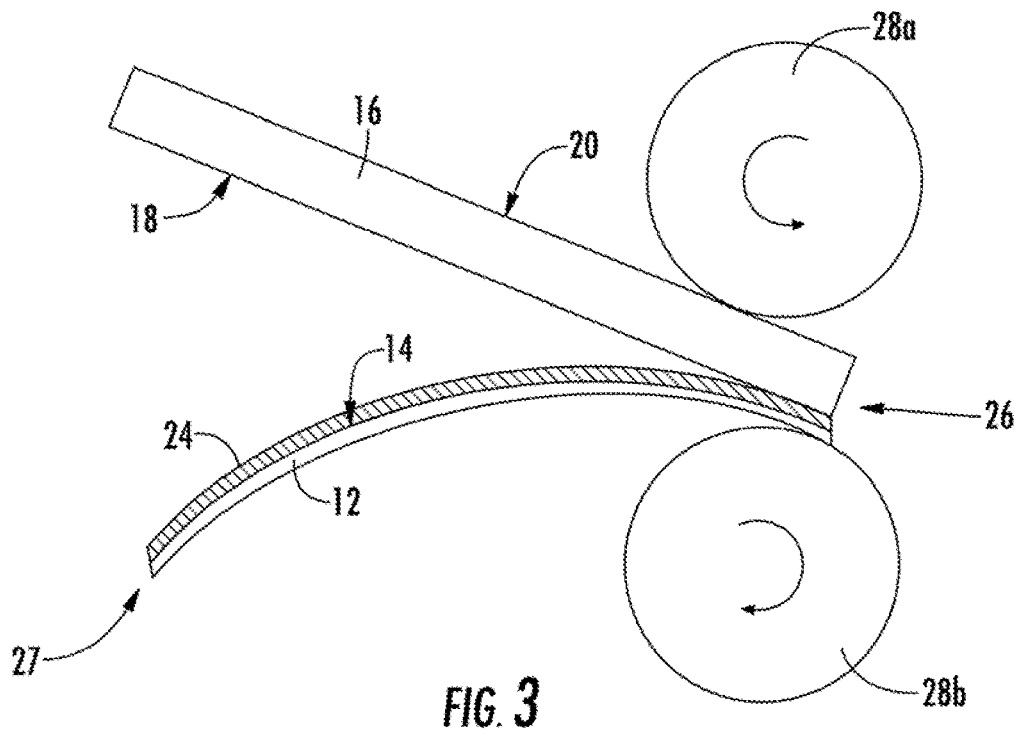
FIG. 3 depicts a stage of a rolling process for laminating a glass substrate to a frame, according to an exemplary embodiment.

FIG. 3 depicts the start of the rolling process to attach the glass substrate 16 to the frame 12. As can be seen, the glass substrate 16 is aligned with a first end 26 of the frame 12, and the first end 26 is inserted between rollers 28a, 28b to begin rolling. The rollers 28a, 28b draw the frame 12 and glass substrate 16 through the roller gap, which applies pressure to the glass substrate 16 and frame 12 to adhere the glass substrate to the frame 12 via the adhesive layer 24. After passing through the rollers 28a, 28b from the first end 26 to a second end 27, the tack strength of the pressure sensitive adhesive in the adhesive layer holds the glass substrate 16 in the curved shape following rolling.

In various embodiments, first major surface 18 and/or the second major surface 20 of glass substrate 16 includes one or more surface treatments or layers. The surface treatment may cover at least a portion of the first major surface 18 and/or second major surface 20. Exemplary surface treatments include anti-glare surfaces/coatings, anti-reflective surfaces/coatings, and an easy-to-clean surface coating/treatment. In one or more embodiments, at least a portion of the first major surface 18 and/or the second major surface 20 may include any one, any two or all three of an anti-glare surface, an anti-reflective surface, and easy-to-clean coating/treatment. For example, first major surface 18 may include an anti-glare surface and second major surface 20 may include an anti-reflective surface. In another example, first major surface 18 includes an anti-reflective surface and second major surface 20 includes an anti-glare surface. In yet another example, the first major surface 18 comprises either one of or both the anti-glare surface and the anti-reflective surface, and the second major surface 20 includes the easy-to-clean coating.

Further, many glass surface treatments (e.g., anti-glare coatings, anti-reflective coatings, easy-to-clean coating, etc.) are applied via deposition processes, such as sputtering processes that are typically ill-suited for coating curved glass articles. In addition, many surface treatments (e.g., anti-glare coatings, anti-reflective coatings, easy-to-clean coating, etc.) also are not able to survive the high temperatures associated with hot-bending processes. Thus, in particular embodiments discussed herein, one or more surface treatments are applied to the first major surface 18 and/or to the second major surface 20 of the glass substrate 16 prior to rolling, and the glass substrate 16 including the surface treatment is bent to a curved shape as discussed herein. Thus, Applicant believes that the processes and systems discussed herein allow for bending of glass after one or more coating materials have been applied to the glass, in contrast to typical hot-forming processes.

In embodiments, the glass substrate 16 may also include a decorative coating on the first major surface 18 and/or second major surface 20. The decorative coating may include any aesthetic design formed from a dye, pigment, or combination of dye and pigment (e.g., ink, paint and the like) and can include a wood-grain design, a brushed metal design, a graphic design, a portrait, or a logo. The decorative coating may be printed onto the glass substrate. In one or more embodiments, the anti-glare surface includes an etched surface. In one or more embodiments, the anti-reflective surface includes a multi-layer coating.

Advantageously, Applicant believes that rolling allows for formation of a glass article 10 while preserving various coatings located on the glass substrate 16 that might otherwise be damaged or destroyed at high temperatures typically associated with conventional glass bending processes.

Referring to FIGS. 4A-4B, 5, 6, and 7, various configurations of the adhesive layer 24 are depicted.

Figure 4A:
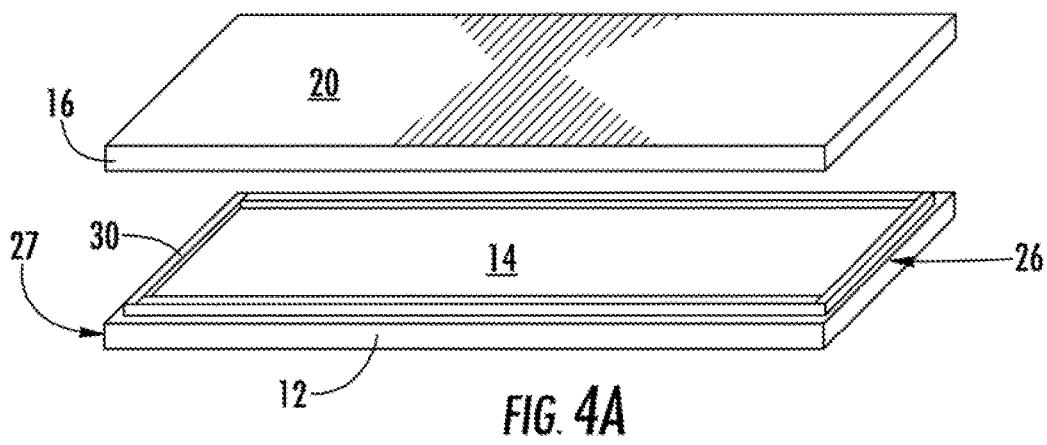
FIGS. 4A and 4B depict a configuration of the adhesive layer as applied to the frame, according to an exemplary embodiment.
Figure 4B:
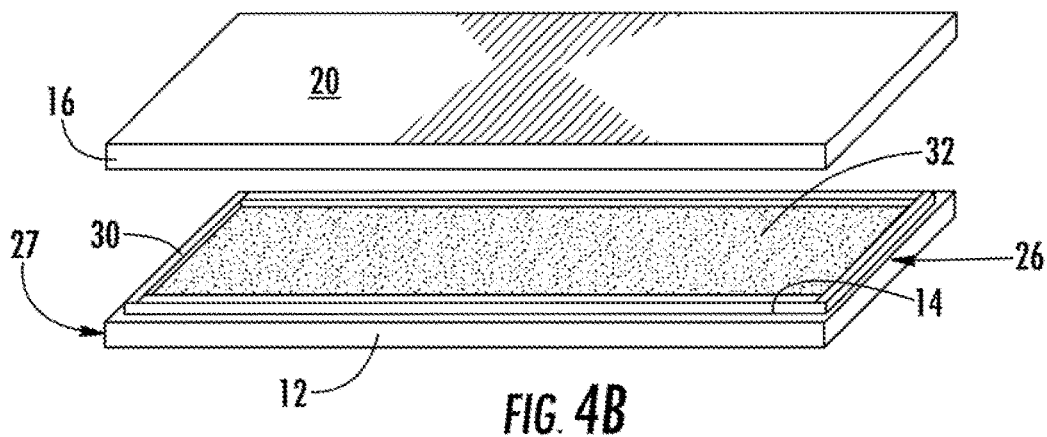

Referring first to FIG. 4A, a border of pressure sensitive adhesive 30 has been applied to the frame 12. That is, the pressure sensitive adhesive 30 is disposed proximal the edges defining the perimeter of the frame 12; however, in other embodiments, the pressure sensitive adhesive 30 may be applied proximal to the edges defining the perimeter of the glass substrate 16 in addition to or instead of the frame 12. In embodiments, "proximal" means that the pressure sensitive adhesive is applied at or near the edges of the glass substrate 16 and/or frame, e.g., within 5 cm, within 2 cm, or within 1 cm of the edge. Further, in embodiments, the pressure sensitive adhesive 30 is applied continuously around the perimeter, i.e., there are no breaks in the pressure sensitive adhesive 30. By placing the pressure sensitive adhesive 30 continuously around the perimeter of the frame 12, a liquid adhesive 32 is able to be applied within the boundary defined by the pressure sensitive adhesive 30 as shown in FIG. 4B. In this way, the pressure sensitive adhesive 30 acts as a dam to prevent the liquid adhesive 32 from squeezing out of the edges of the glass article 10 during rolling. However, in other embodiments, the pressure sensitive adhesive 30 may be applied discontinuously around the perimeter of the glass substrate 16 and/or frame 12, i.e., applied in such a way that there are breaks between strips of pressure sensitive adhesive 30. Further, as with the pressure sensitive adhesive 32, the liquid adhesive 30 can, in embodiments, be applied to the glass substrate 16 in addition to or instead of the frame 12.

In embodiments, the pressure sensitive adhesive 30 is applied in strips having a width of from 0.05" to 1.5". In embodiments, the pressure sensitive adhesive 30 strips have a thickness of 0.025 mm to 3.5 mm. In an embodiment, the pressure sensitive adhesive 28 is 3M™ VHB™, such as #8412BLACK, #5909, #4611, #4930, #5952, (available from 3M, St. Paul, MN), Tesa®, such as #7805, #61057, (available from tesa SE, Norderstedt, Germany), or DAI-TAC STA400 or TRYCK (available from DIC Corporation, Tokyo, Japan).

The liquid adhesive 32 is selected to provide long term strength after curing over the course of, e.g., about 15 min to 8 days at a temperature of from 18° C. to 80° C. In embodiments, exemplary adhesives for the liquid adhesive 32 include epoxies, acrylics, polyurethanes, polyurethane hotmelts, silane modified polymers and/or silicones. In specific embodiments, the liquid adhesive 32 includes one or more toughened epoxies, such as EP21TDCHT-LO (available from Masterbond®, Hackensack, NJ), 3M™ Scotch-Weld™ Epoxy DP460 Off-White (available from 3M, St. Paul, MN). In other embodiments, the liquid adhesive 32 includes one or more flexible epoxies, such as Masterbond EP21TDC-2LO (available from Masterbond®, Hackensack, NJ), 3M™ Scotch-Weld™ Epoxy 2216 B/A Gray (available from 3M, St. Paul, MN), and 3M™ Scotch-Weld™ Epoxy DP125.

In still other embodiments, the liquid adhesive 32 includes one or more acrylics, such as LORD® Adhesive 410/Accelerator 19 w/LORD® AP 134 primer, LORD® Adhesive 852/LORD® Accelerator 25 GB (both being available from LORD Corporation, Cary, NC), DELO PUR SJ9356 (available from DELO Industrial Adhesives, Windach, Germany), Loctite® AA4800, Loctite® HF8000. In still others, the liquid adhesive includes silane modified polymers, such as TEROSON® MS 9399, and TEROSON® MS 647-2C (these latter four being available from Henkel AG & Co. KGaA, Düsseldorf, Germany), or one or more silicones, such as Dow Corning® 995, Dow Corning® 7091 (available from Dow Corning Corporation, Midland, MI), among others.

In yet other embodiments, the liquid adhesive 32 includes one or more polyurethane hotmelts, such as Loctite HHD 3542 (available from Henkel AG & Co. KGaA, Düsseldorf, Germany). In yet other embodiments, the liquid adhesive 32 includes one or more polyurethanes, such as 3M™ Scotch-Weld™ Urethane DP640 Brown, 3M™ Scotch-Weld™ Urethane DP604 (both available from 3M, St. Paul, MN), Betamate™ 73100, Betaseal™ X2500 and Betalink™ K2 (these latter three being available from The Dow Chemical Company, Midland, MI).

In embodiments, a primer can be applied to prepare the surfaces of the glass substrate 16 and frame 12 for better adhesion to the pressure sensitive adhesive 30 and/or the liquid adhesive 30, especially for frames 12 made of metal or including metal surfaces and for the glass surface of the glass substrate 16. Further, in embodiments, an ink primer may be used in addition to the primer for metal and glass surfaces. The ink primer helps provide better adhesion between the liquid adhesive 32 to ink covered surfaces (e.g., the decorative coating mentioned above for deadfronting applications). An example of a primer is 3M™ Scotch-Weld™ Metal Primer 3901 (available from 3M, St. Paul, MN); other commercially available primers are also suitable for use in the present disclosure and can be selected based on surfaces involved in the bonding and on the adhesive used to create the bond.

As discussed above, after applying the adhesive layer 24, including the pressure sensitive adhesive 30 and the liquid adhesive 32, the glass substrate 16 is aligned with the frame 12. During rolling, the glass substrate 16 is laminated to the frame 12. Further, when the frame 12 is curved (e.g., as shown in FIGS. 2, 3, and 8-10), the glass substrate 16 is also bent into conformity with the curvature of the frame 12. In embodiments, the rolling process is performed at room temperature (e.g., about 20° C.) or the rollers 28a, 28b may be at an elevated temperature, e.g., at 150° C. or less, at 100° C. or less, or at 50° C. or less. In embodiments, the glass substrate 16 is rolled at room temperature and then the adhesive layer 24 is cured for an extended period of time. During rolling, the pressure sensitive adhesive 30 secures the glass substrate 16 into place on the frame 12 immediately as compared to conventional processes in which the glass substrate 16 and frame 12 are required to cure at elevated temperatures for an extended time period on the order of several tens of minutes. In this way, the pressure sensitive adhesive 30 provides tack strength to maintain the glass substrate 16 in conformity with the frame 12, especially when forming curved glass articles. Advantageously, curing the glass article 10 in this way is much more economical than previous cold forming methods because the glass article 10 does not have to be kept at elevated temperature and/or under vacuum throughout the forming process.

Figure 5:
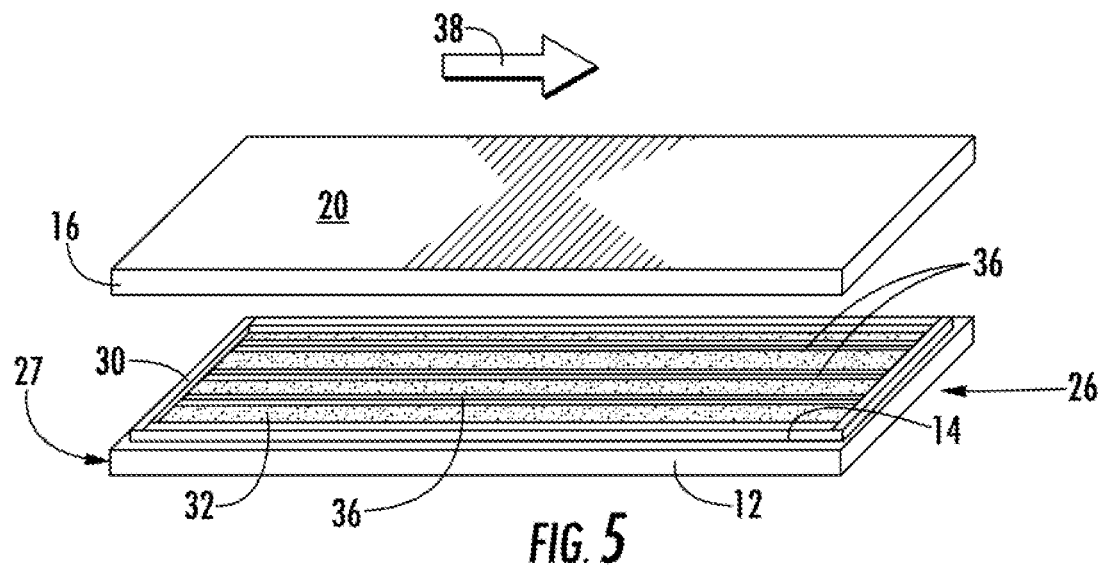
FIG. 5 depicts another configuration of the adhesive layer as applied to the frame, according to an exemplary embodiment.

As can be seen in FIG. 5, the pressure sensitive adhesive 30 and the liquid adhesive 32 can be arranged in different configurations in the adhesive layer 24. In FIG. 5, the pressure sensitive adhesive 30 is placed proximal to the perimeter of the frame 12. Additionally, strips 36 of pressure sensitive adhesive 30 are placed across the frame 12 going from the first end 26 to the second end 27. The strips 36 are parallel to the rolling direction (arrow 38). As shown in FIG. 5, the liquid adhesive 32 is deposited between the strips 36 of the pressure sensitive adhesive 30. In the particular embodiment of FIG. 5, there are three interior strips 36 of pressure sensitive adhesive 30. In other embodiments, one strip 36, two strips 36, or more than three strips 36 of pressure sensitive adhesive 30 may be provided on the frame 12 and/or glass substrate 16. In embodiments, the width of the frame 12 and/or glass substrate 16 may dictate the number of interior strips 36 provided on the frame 12 and/or glass substrate 16.

Figure 6:
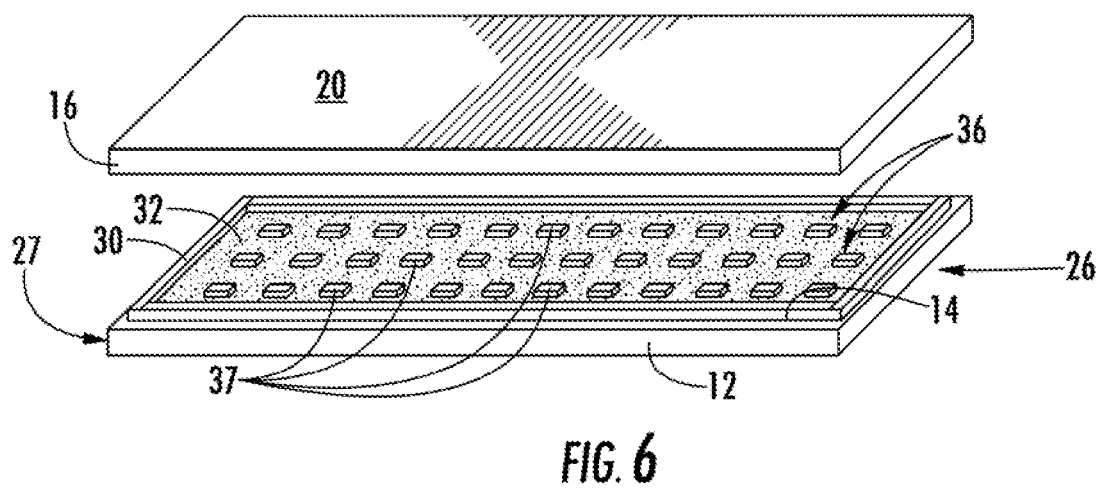
FIG. 6 depicts yet another configuration of the adhesive layer as applied to the frame, according to an exemplary embodiment.

FIG. 6 depicts a discontinuous strip 36 of pressure sensitive adhesive 30 made up of multiple pieces 37 of pressure sensitive adhesive 28 placed within the perimeter of pressure sensitive adhesive 30. The pieces 37 are surrounded by the liquid adhesive 32 on the interior of the perimeter of the pressure sensitive adhesive 30. In the embodiment depicted, the sections 37 are rectangular in shape and have a substantially regular spacing. However, in other embodiments, the pieces 37 may be other polygonal or curved shapes, such as squares, triangles, diamonds, circles, ovals, etc., and may be spaced at regular or irregular intervals.

Figure 7:
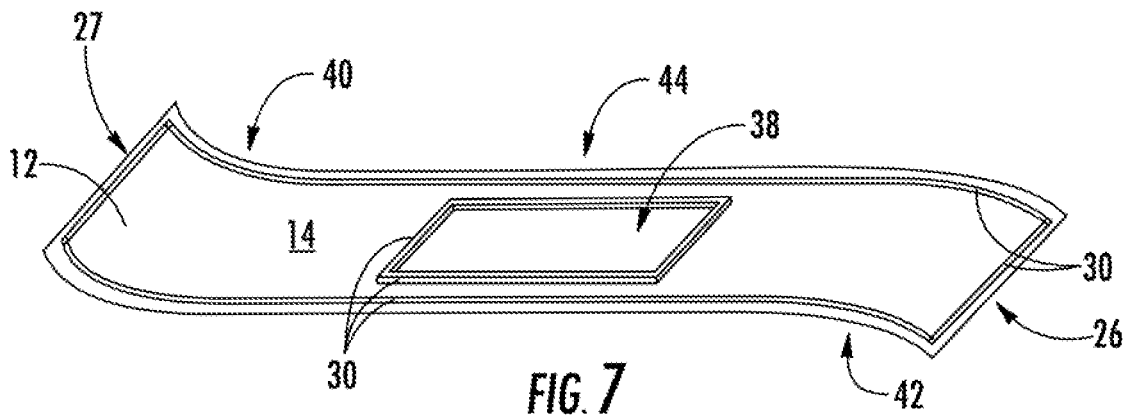
FIG. 7 depicts a configuration of the pressure sensitive adhesive as applied to a curved frame, according to an exemplary embodiment.
Figure 8:
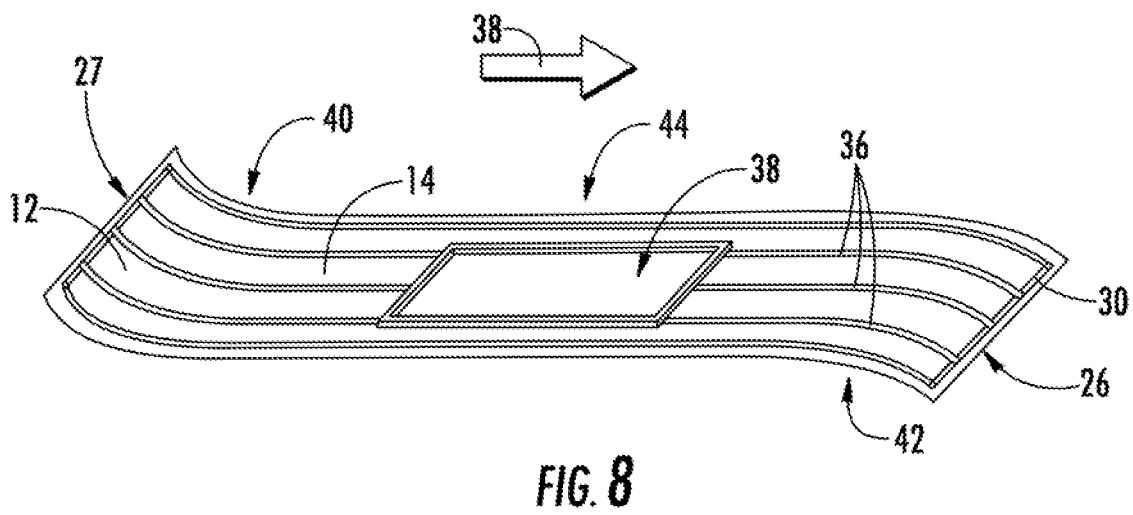
FIG. 8 depicts another configuration of the pressure sensitive adhesive as applied to a curved frame, according to an exemplary embodiment.
Figure 9:
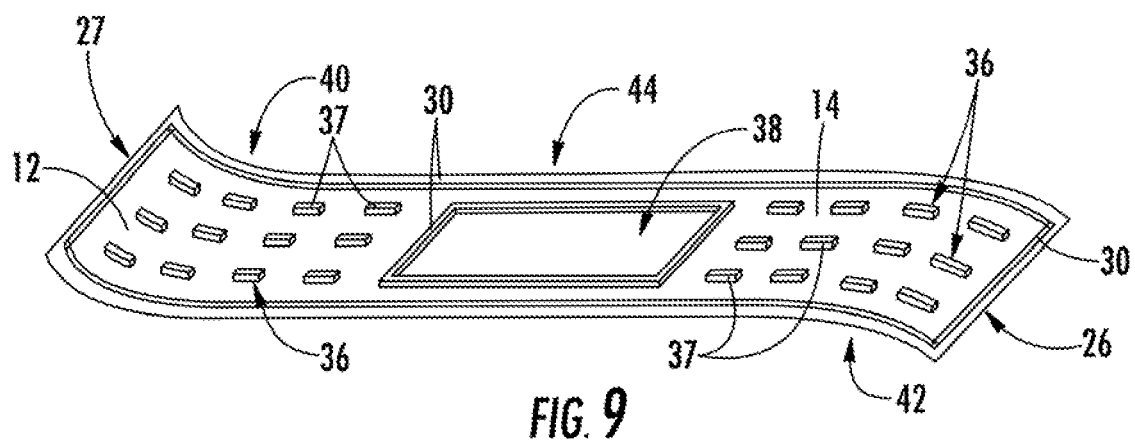
FIG. 9 depicts a further configuration of the pressure sensitive adhesive as applied to a curved frame, according to an exemplary embodiment.

FIGS. 7-9 depict embodiments of a curved frame 12 with an opening 38 for a display. In the embodiment shown in FIG. 7, the frame 12 includes a first concave curve 40 and a second convex curve 42 that are separated by a flat section 44. Thus, when viewed from the side, the frame 12 has somewhat of an S-shaped curve. In the embodiment depicted, the opening 38 for the display is disposed in the flat section 44 of the frame 12. Further, in embodiments, the radius of curvature for the first concave curve 40 is the same as the radius of curvature for the second convex curve 42, and in other embodiments, the radius of curvature for the first concave curve 40 is different from the radius of curvature for the second convex curve 42. In FIG. 7, the pressure sensitive adhesive 30 is placed proximal to the perimeter of the frame 12 and around the perimeter of the opening 38. In FIG. 8, strips 36 of pressure sensitive adhesive 30 are also provided running along the frame 12 parallel to the rolling direction 38. As can be seen in FIG. 8, the strips 36 are continuous from the first end 26 to the second end 27 of the frame 12. However, as shown in FIG. 9, the strips 36 are discontinuous from the first end 26 to the second end 27 of the frame. That is, pieces 37 of pressure sensitive adhesive 30 are disposed on the surface of the frame 12. As with the pieces 37 shown in the embodiment of FIG. 6, the pieces 37 of the embodiment of FIG. 9 may polygonal or curved shapes, such as rectangles, squares, triangles, diamonds, circles, ovals, etc., and may be spaced at regular or irregular intervals. The liquid adhesive (not shown) fills in the space between the strips 36 or pieces 37 of the pressure sensitive adhesive 30. Advantageously, with respect to the embodiments depicted in FIGS. 7-9, by providing the pressure sensitive adhesive around the opening 38, the pressure sensitive adhesive 30 can prevent contact between the liquid adhesive 32 and an optically clear adhesive that is used to attache a display device to the glass substrate 16 in the area of the opening 38.

In embodiments, the pressure sensitive adhesive 30 and the liquid adhesive 32 are arranged so that the pressure sensitive adhesive 30 covers a first region of the frame 12 and/or glass substrate 16 and so that the liquid adhesive 32 covers a second region of the frame 12 and/or the glass substrate 16. The ratio of first region to the second region may be selected to provide sufficient tack strength for the initial tacking of the glass substrate 16 to the frame 12 and sufficient structural bond strength to secure the glass substrate 16 to the frame 12 after curing. Additionally, the ratio may be selected to provide stress relief at various locations over the glass substrate 16 and frame 12. For example, the regions of relatively high bonding stress may develop where the liquid adhesive 32 is located. Such high bonding stress regions may be stress relieved in the surrounding regions by locating the pressure sensitive adhesive 30, which will have a relatively lower bonding stress, in surrounding regions. In embodiments, the ratio of the first region to the second region may be from 1:150 to 1:1. For example, when the radius of curvature is greater than or equal to 10000 mm, the ratio of the first region to the second region may be 1:10 to 1:150. Further, for radii less than (<) 10000 mm, the ratio of the first region to the second region may be in the range of 1:80 to 1:2. Still further, for radii less 5000 mm, the ratio of the first region to the second region may be 1:50 to 1:1.

Figure 10:
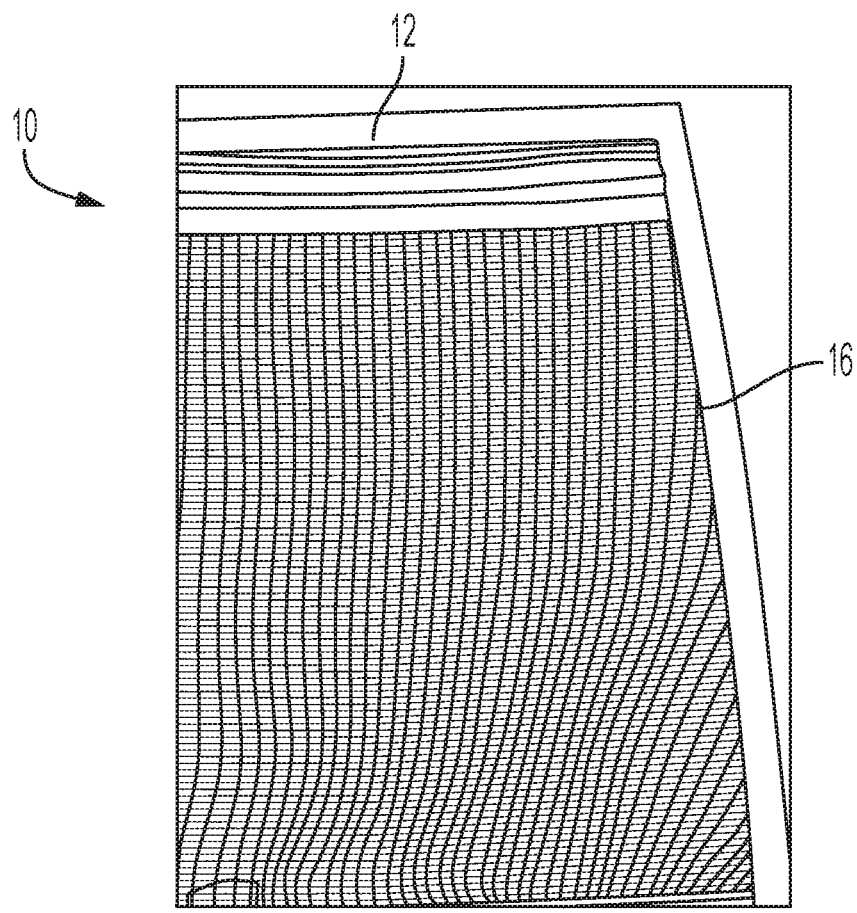
FIG. 10 is a picture depicting limited reflection distortion on a partial top view of a glass substrate laminated to a curved frame, according to an exemplary embodiment.

FIG. 10 depicts an internal reflection distortion image of a glass article 10 formed from a glass substrate 16 laminated to a frame 12 via rolling using an adhesive layer comprising pressure sensitive adhesive and liquid adhesive. As can be seen in FIG. 10, the two adhesives of the adhesive layer do not cause substantial distortion of the reflected image. That is, the rows and columns of the reflected image are not substantially wavy and are instead relatively uniform across the width and along the length of the glass substrate 16 of the glass article 10. The lack of distortion in this regard indicates that the adhesive layer is relative uniform in thickness despite the use of two different types of adhesive.

Figure 11:
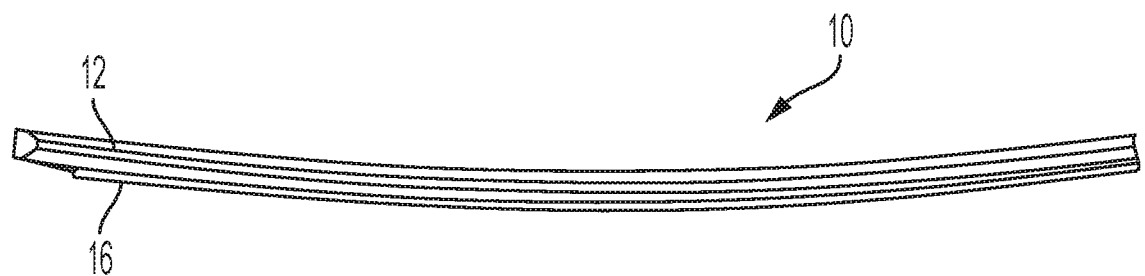
FIG. 11 is picture depicting a side view of a glass substrate laminated to a curved frame that has undergone environmental testing, according to an exemplary embodiment.

FIG. 11 depicts a side view of a glass article 10 after having undergone environmental testing according to a modified GMW3172 test. To form the glass article 10, a glass substrate 12 was laminated to a frame 12 via rolling using an adhesive layer comprising pressure sensitive adhesive and liquid adhesive. The testing involved exposing the glass article 10 to a modified GMW3172 Environmental/Durability test. The modified GMW3172 includes cumulative stress applied through a sequential testing at 85° C./85% RH for 240 hours, followed by humid heat cycling with frost for 240 hours, followed by 95° C. for 500 hours, followed by thermal shock of −40° C. (0.5 hour) to 95° C. (0.5 hour) for 500 cycles. The modified GMW3172 also includes vibration testing with thermal cycling from −40° C. to 95° C. with random vibration at 2 $G_{RMS}$ with no specific frequencies defined (system driven) and omni axis (6 Cartesian directions) and mechanical shock (pothole) with half-sine shock pulse with peak of 25 G for duration of 10 ms with a total of 800 impacts in Z-direction. As can be seen in FIG. 11, the glass article 10 does not exhibit any delamination of the glass substrate 16 from the frame 12.

In various embodiments, glass substrate 16 is formed from a strengthened glass sheet (e.g., a thermally strengthened glass material, a chemically strengthened glass sheet, etc.) In such embodiments, when glass substrate 16 is formed from a strengthened glass material, first major surface 18 and second major surface 20 are under compressive stress, and thus second major surface 20 can experience greater tensile stress during bending to the convex shape without risking fracture. This allows for strengthened glass substrate 16 to conform to more tightly curved surfaces.

A feature of a cold-formed glass substrate is an asymmetric surface compressive between the first major surface 18 and the second major surface 20 once the glass substrate has been bent to the curved shape. In such embodiments, prior to the cold-forming process or being cold-formed, the respective compressive stresses in the first major surface 18 and the second major surface 20 of glass substrate 16 are substantially equal. After cold-forming, the compressive stress on concave first major surface 18 increases such that the compressive stress on the first major surface 18 is greater after cold-forming than before cold-forming. In contrast, convex second major surface 20 experiences tensile stresses during bending causing a net decrease in surface compressive stress on the second major surface 20, such that the compressive stress in the second major surface 20 following bending is less than the compressive stress in the second major surface 20 when the glass sheet is flat.

As noted above, in addition to providing processing advantages such as eliminating expensive and/or slow heating steps, the cold-forming processes discussed herein are believed to generate glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass substrates formed utilizing the cold-bending processes/systems discussed herein provide for both curved glass shapes along with improved optical qualities not believed achievable with hot-bending processes.

In various embodiments, the glass substrate 16 may have a compound curve including a major radius and a cross curvature. A complexly curved glass substrate 16 may have a distinct radius of curvature in two independent directions. According to one or more embodiments, a complexly curved glass substrate 16 may thus be characterized as having "cross curvature," where the glass substrate 16 is curved along an axis (i.e., a first axis) that is parallel to a given dimension and also curved along an axis (i.e., a second axis) that is perpendicular to the same dimension. The curvature of the glass substrate can be even more complex when a significant minimum radius is combined with a significant cross curvature, and/or depth of bend. In various embodiments, the glass substrate 16 can have more than two curved regions with the same or differing curved shapes. In some embodiments, the glass substrate 16 can have one or more region having a curved shape with a variable radius of curvature.

Figure 12:
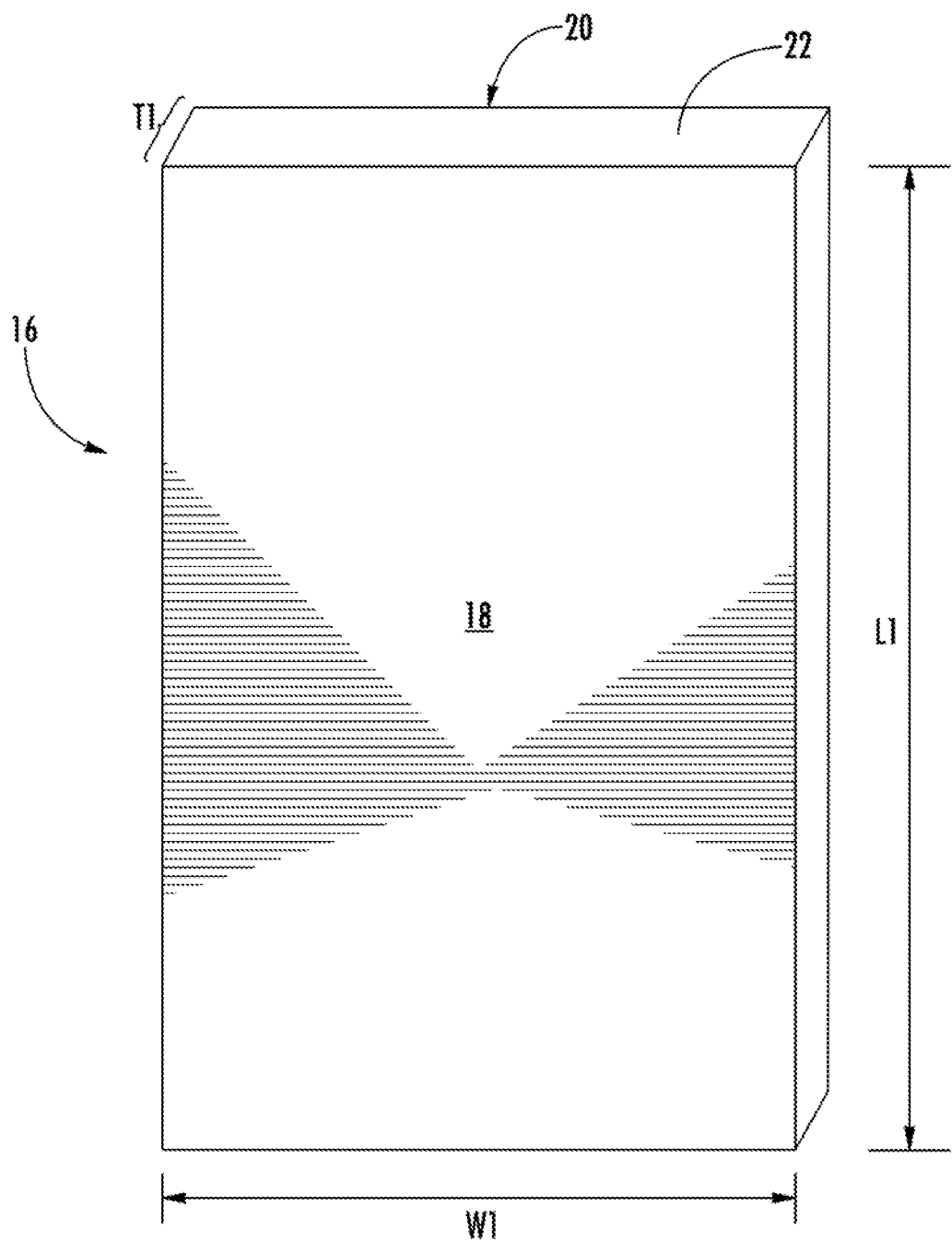
FIG. 12 is a front perspective view of a glass substrate, according to an exemplary embodiment.

Referring to FIG. 12, additional structural details of the glass substrate 16 are shown and described. As noted above, the glass substrate 16 has a thickness T1 that is substantially constant and is defined as a distance between the first major surface 18 and the second major surface 20. In various embodiments, T1 may refer to an average thickness or a maximum thickness of the glass substrate. In addition, the glass substrate 16 includes a width W1 defined as a first maximum dimension of one of the first or second major surfaces 18, 20 orthogonal to the thickness T1, and a length L1 defined as a second maximum dimension of one of the first or second major surfaces 18, 20 orthogonal to both the thickness and the width. In other embodiments, W1 and L1 may be the average width and the average length of the glass substrate 16, respectively.

In various embodiments, thickness T1 is 2 mm or less and specifically is 0.3 mm to 1.1 mm. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L1 falls within any one of the exact numerical ranges set forth in this paragraph.

In various embodiments, one or more radius of curvature (e.g., R1 shown in FIG. 2) of glass substrate 16 is about 60 mm or greater. For example, R1 may be in a range from about 60 mm to about 10,000 mm, from about 70 mm to about 10,000 mm, from about 80 mm to about 10,000 mm, from about 90 mm to about 10000 mm, from about 100 mm to about 10000 mm, from about 120 mm to about 10000 mm, from about 140 mm to about 10000 mm, from about 150 mm to about 10000 mm, from about 160 mm to about 10000 mm, from about 180 mm to about 10000 mm, from about 200 mm to about 10000 mm, from about 220 mm to about 10000 mm, from about 240 mm to about 10000 mm, from about 250 mm to about 10000 mm, from about 260 mm to about 10000 mm, from about 270 mm to about 10000 mm, from about 280 mm to about 10000 mm, from about 290 mm to about 10000 mm, from about 300 mm to about 10000 mm, from about 350 mm to about 10000 mm, from about 400 mm to about 10000 mm, from about 450 mm to about 10000 mm, from about 500 mm to about 10000 mm, from about 550 mm to about 10000 mm, from about 600 mm to about 10000 mm, from about 650 mm to about 10000 mm, from about 700 mm to about 10000 mm, from about 750 mm to about 10000 mm, from about 800 mm to about 10000 mm, from about 900 mm to about 10000 mm, from about 950 mm to about 10000 mm, from about 1000 mm to about 10000 mm, from about 1250 mm to about 10000 mm, from about 60 mm to about 9000 mm, from about 60 mm to about 8000 mm, from about 60 mm to about 720000 mm, from about 60 mm to about 6000 mm, from about 60 mm to about 5000 mm, from about 60 mm to about 4000 mm, from about 60 mm to about 3000 mm, from about 60 mm to about 2500 mm, from about 60 mm to about 2000 mm, from about 60 mm to about 1800 mm, from about 60 mm to about 1600 mm, from about 60 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In other embodiments, R1 falls within any one of the exact numerical ranges set forth in this paragraph.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass substrate 16 may be strengthened. In one or more embodiments, glass substrate 16 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass substrate 16 may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In various embodiments, glass substrate 16 may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by a single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate may be strengthened to exhibit a DOC that is described as a fraction of the thickness T1 of the glass substrate (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, the DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm. In other embodiments, DOC falls within any one of the exact numerical ranges set forth in this paragraph.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass substrate 16 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass substrate 16 may be made from any glass composition falling with any one of the exact numerical ranges discussed above.

Aspect (1) pertains to a method of forming a glass article, the glass article comprising a glass cover sheet and a frame, wherein the glass cover sheet comprises a first major surface and a second major surface, the second major surface being opposite the first major surface, and wherein the frame comprises a support surface, the method comprising the steps of: applying a pressure-sensitive adhesive tape to a first region of the first major surface of the glass cover sheet or of the support surface of the frame; applying a liquid adhesive to a second region of the first major surface of the glass cover sheet or of the support surface of the frame; positioning the glass cover sheet in relation to the frame such that the first major surface of the glass cover sheet faces the support surface of the frame; applying pressure to the glass cover sheet and the frame to cause the pressure-sensitive adhesive to adhere the glass cover sheet to the frame at a first bond strength; and curing the liquid adhesive to adhere the glass cover sheet to the frame at a second bond strength, the second bond strength being greater than the first bond strength.

Aspect (2) pertains to the method of Aspect (1), wherein the liquid adhesive comprises at least one of an epoxy, an acrylic, a polyurethane, polyurethane hotmelt, a silicone, or a silane modified polymer.

Aspect (3) pertains to the method of Aspect (1) or Aspect (2), wherein the first bond strength is from 0.05 MPa to 5 MPa as measured at room temperature.

Aspect (4) pertains to the method of any one of Aspects (1) through (3), wherein the step of applying the pressure-sensitive adhesive tape further comprises applying the pressure-sensitive adhesive tape proximal to a perimeter of the glass cover sheet or of the frame.

Aspect (5) pertains to the method of Aspect (4), wherein the pressure-sensitive adhesive tape proximal to the perimeter of the glass cover sheet or of the frame surrounds the second region.

Aspect (6) pertains to the method of any one of Aspects (1) through (5), wherein the step of applying pressure to the glass cover sheet and the frame further comprises applying pressure that translates in a translation direction across the glass cover sheet and the frame from a first end to a second end; and wherein the step of applying the press-sensitive adhesive tape further comprises applying applying at least one strip of pressure-sensitive adhesive tape substantially parallel to the translation direction.

Aspect (7) pertains to the method of Aspect (6), wherein the at least one strip comprises a continuous strip along a length of the cover glass sheet or the frame.

Aspect (8) pertains to the method of Aspect (6) or Aspect (7), wherein the at least one strip comprises a discontinuous strip along a length of the cover glass sheet or the frame.

Aspect (9) pertains to the method of any one of Aspects (6) through (8), wherein the step of applying the pressure-sensitive adhesive tape does not comprise applying pressure-sensitive adhesive tape in strips having a length that is perpendicular to the direction in which the pressure is applied to the glass cover sheet and the frame.

Aspect (10) pertains to the method of any one of Aspects (1) through (9), wherein applying pressure to the glass cover sheet and the frame further comprises passing the glass cover sheet and the frame through at least one set of rollers.

Aspect (11) pertains to the method of Aspect (10), wherein the step of applying the pressure-sensitive adhesive tape further comprises applying at least one strip of pressure-sensitive adhesive tape substantially parallel to a direction in which the glass cover sheet and the frame are passed through the at least one set of rollers.

Aspect (12) pertains to the method of any one of Aspects (1) through (11), wherein the frame comprises a curved surface on the support surface and, prior to the step of applying pressure to the glass cover sheet and the frame, the glass cover sheet is substantially planar and wherein, after the step of applying pressure to the glass cover sheet and the frame, the glass cover sheet is bent into conformity with the curved surface.

Aspect (13) pertains to the method of Aspect (12), wherein the frame is complexly curved.

Aspect (14) pertains to the method of Aspect (12) or Aspect (13), wherein the curved surface includes a radius of curvature of <10000 mm and wherein the ratio of the first region to the second region is from 1:80 to 1:2.

Aspect (15) pertains to the method of any one of Aspects (1) through (14), wherein the frame comprises an opening for mounting a display device and wherein the step of applying the pressure-sensitive adhesive tape further comprises applying the pressure-sensitive adhesive tape around at least a portion of the opening.

Aspect (16) pertains to the method of any one of Aspects (1) through (15), wherein the first region forms a barrier enclosing the second region so that the first adhesive prevents leakage of the second adhesive from between the glass cover sheet and the frame.

Aspect (17) pertains to the method of any one of Aspects (1) through (16), wherein the glass cover sheet comprises a chemically strengthened aluminosilicate glass composition.

Aspect (18) pertains to the method of any one of Aspects (1) through (17), wherein the glass cover sheet has a thickness of from 0.4 mm to 2.0 mm.

Aspect (19) pertains to the method of any one of Aspects (1) through (18), wherein the curing step further comprises curing the liquid adhesive using elevated temperatures, infrared radiation, or ultraviolet radiation.

Aspect (20) pertains to the method of any one of Aspects (1) through (18), wherein the curing step further comprises curing the liquid adhesive at room temperature.

Aspect (21) pertains to the method of any one of Aspects (1) through (18), wherein the curing step further comprises curing the liquid adhesive in a temperature range of room temperature to 150° C.

Aspect (22) pertains to the method of any one of Aspects (1) through (21), wherein the method further comprises the step of applying a surface treatment to the second major surface of the glass cover sheet before the step of applying pressure to the glass cover sheet and the frame.

Aspect (23) pertains to the method of Aspect (21), wherein the surface treatment is at least one of an anti-glare treatment, an anti-reflective coating, and easy-to-clean coating.

Aspect (24) pertains to a glass article, comprising: a glass cover sheet having a first major surface and a second major surface, the second major surface comprising at least a first curve; a frame having a support surface comprising at least a first complementary curve, wherein the second major surface of the cover glass sheet faces the support surface of the frame and wherein the first complementary curve is complementary to the first curve; a pressure-sensitive adhesive tape disposed in at least a first region between the first major surface of the frame and the second major surface of the glass cover sheet; and a cured liquid adhesive disposed in at least a second region between the first major surface of the frame and the second major surface of the glass cover sheet.

Aspect (25) pertains to the glass article of Aspect (24), wherein the pressure-sensitive adhesive tape bonds the glass cover sheet to the frame with a bond strength of from 0.05 MPa to 5 MPa as measured at room temperature.

Aspect (26) pertains to the glass article of Aspect (24) or Aspect (25), wherein the cured liquid adhesive bonds the glass cover sheet to the frame with a bond strength of from 0.5 MPa to 25 MPa as measured at room temperature.

Aspect (27) pertains to the glass article of any one of Aspects (24) through (26), wherein the cured liquid adhesive comprises at least one of an epoxy, an acrylic, a polyurethane, polyurethane hotmelt, a silicone, or a silane modified polymer.

Aspect (28) pertains to the glass article of any one of Aspects (24) through (27), further comprising a display bonded to the frame using optically clear adhesive, wherein the pressure-sensitive adhesive tape encloses the optically clear adhesive such that the cured liquid adhesive does not contact the optically clear adhesive.

Aspect (29) pertains to the glass article of any one of Aspects (24) through (28), wherein the first region is proximal to a perimeter of the glass cover sheet, wherein the glass cover sheet encloses the second region so that the pressure-sensitive adhesive tape prevents leakage of the cured liquid adhesive from between the glass cover sheet and the frame past the perimeter of the glass cover sheet.

Aspect (30) pertains to the glass article of any one of Aspects (24) through (29), wherein the glass cover sheet comprises a chemically strengthened aluminosilicate glass composition.

Aspect (31) pertains to the glass article of any one of Aspects (24) through (30), wherein the glass cover sheet has a thickness of from 0.4 mm to 2.0 mm.

Aspect (32) pertains to the glass article of any one of Aspects (24) through (31), further comprising a surface treatment on the first major surface of the glass cover sheet.

Aspect (33) pertains to the glass article of any one of Aspects (24) through (32), wherein the surface treatment is at least one of an anti-glare treatment, an anti-reflective coating, and easy-to-clean coating.

Aspect (34) pertains to the glass article of any one of Aspects (24) through (33), wherein the first and second curves each comprise at least one location having a radius of curvature of 250 mm or less.

Aspect (35) pertains to the glass article of any one of Aspects (24) through (34), wherein the second major surface of the glass cover sheet comprises a second curve and the support surface of the frame comprises a second complementary curve that complements the second curve.

Aspect (36) pertains to the glass article of Aspect (35), wherein the first curve is concave and the second curve is convex.

Aspect (37) pertains to the glass article of any one of Aspects (24) through (36), wherein the pressure-sensitive adhesive tape comprises continuous strips.

Aspect (38) pertains to the glass article of Aspect (37), wherein at least one of the continuous strips is parallel to a direction of curvature of the first curve.

Aspect (39) pertains to the glass article of Aspect (38), wherein all of the continuous strips are parallel to the direction of curvature of the first curve.

Aspect (40) pertains to the glass article of Aspect (37), wherein at least one of the continuous strips is perpendicular to a direction of curvature of the first curve.

Aspect (41) pertains to the glass article of Aspect (40), wherein all of the continuous strips are perpendicular to a direction of curvature of the first curve.

Aspect (42) pertains to the glass article of any one of Aspects (24) through (41), wherein the pressure-sensitive adhesive tape comprises discontinuous strips.

Aspect (43) pertains to the glass article of any one of Aspects (24) through (42), wherein a ratio of surface area covered by the first region to surface area covered by the second region is from 1:150 to 1:1.

Aspect (44) pertains to the glass article of any one of Aspects (24) through (43), wherein the glass article experiences no delamination of the glass cover sheet from the frame after undergoing environmental durability testing according to a modified GMW3172.

Aspect (45) pertains to a vehicle interior comprising the glass article according to any one of Aspects (24) through (44).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article, comprising:
   a glass cover sheet having a first major surface and a second major surface, the second major surface comprising at least a first curve;
   a frame having a support surface comprising at least a first complementary curve, wherein the second major surface of the cover glass sheet faces the support surface of the frame and wherein the first complementary curve is complementary to the first curve;
   a pressure-sensitive adhesive tape disposed in at least a first region between the support surface of the frame and the second major surface of the glass cover sheet; and
   a cured liquid adhesive disposed in at least a second region between the support surface of the frame and the second major surface of the glass cover sheet, wherein the pressure-sensitive adhesive tape and the cured liquid adhesive retain the glass cover sheet in a cold-formed state such that that the first major surface and the second major surface comprise different stresses.

2. The glass article of claim 1, wherein the pressure-sensitive adhesive tape bonds the glass cover sheet to the frame with a bond strength of from 0.05 MPa to 5 MPa as measured at room temperature.

3. The glass article of claim 1, wherein the cured liquid adhesive bonds the glass cover sheet to the frame with a bond strength of from 0.5 MPa to 25 MPa as measured at room temperature.

4. The glass article according to claim 1, wherein the cured liquid adhesive comprises at least one of an epoxy, an acrylic, a polyurethane, polyurethane hotmelt, a silicone, or a silane modified polymer, wherein the pressure-sensitive adhesive tape is applied continuously around a perimeter of the support surface.

5. The glass article according to claim 1, further comprising a display bonded to the support surface of the frame or the second major surface using optically clear adhesive, wherein the pressure-sensitive adhesive tape encloses the optically clear adhesive such that the cured liquid adhesive does not contact the optically clear adhesive.

6. The glass article according to claim 1, wherein the first region is proximal to a perimeter of the glass cover sheet, wherein the glass cover sheet encloses the second region so that the pressure-sensitive adhesive tape prevents leakage of the cured liquid adhesive from between the glass cover sheet and the frame past the perimeter of the glass cover sheet.

7. The glass article according to claim 1, wherein the glass cover sheet comprises a strengthened glass composition.

8. The glass article according to claim 1, wherein the glass cover sheet has a thickness of from 0.4 mm to 2.0 mm.

9. The glass article according to claim 1, further comprising a surface treatment on the first major surface of the glass cover sheet.

10. The glass article according claim 1, wherein the first and second curves each comprise at least one location having a radius of curvature in a range from about 60 mm to about 10,000 mm.

11. The glass article according to claim 1, wherein the second major surface of the glass cover sheet comprises a second curve and the support surface of the frame comprises a second complementary curve that complements the second curve.

12. The glass article according to claim 11, wherein the first curve is concave and the second curve is convex.

13. The glass article according to claim 1, wherein the pressure-sensitive adhesive tape comprises continuous strips.

14. The glass article according to claim 13, wherein at least one of the continuous strips is parallel to a direction of curvature of the first curve.

15. The glass article according to claim 13, wherein at least one of the continuous strips is perpendicular to a direction of curvature of the first curve.

16. The glass article according to claim 1, wherein the pressure-sensitive adhesive tape comprises discontinuous strips.

17. The glass article according to claim 1, wherein a ratio of surface area covered by the first region to surface area covered by the second region is from 1:150 to 1:1.

18. The glass article according to claim 1, wherein the glass article experiences no delamination of the glass cover sheet from the frame after undergoing environmental durability testing according to a modified GMW3172.

19. A vehicle interior comprising the glass article according to claim 1.

* * * * *